Nov. 22, 1960     E. SMITH     2,961,107
COMBINATION TRAILER FOR BOAT AND LAUNCHING APPARATUS
Filed Feb. 10, 1958     3 Sheets-Sheet 1
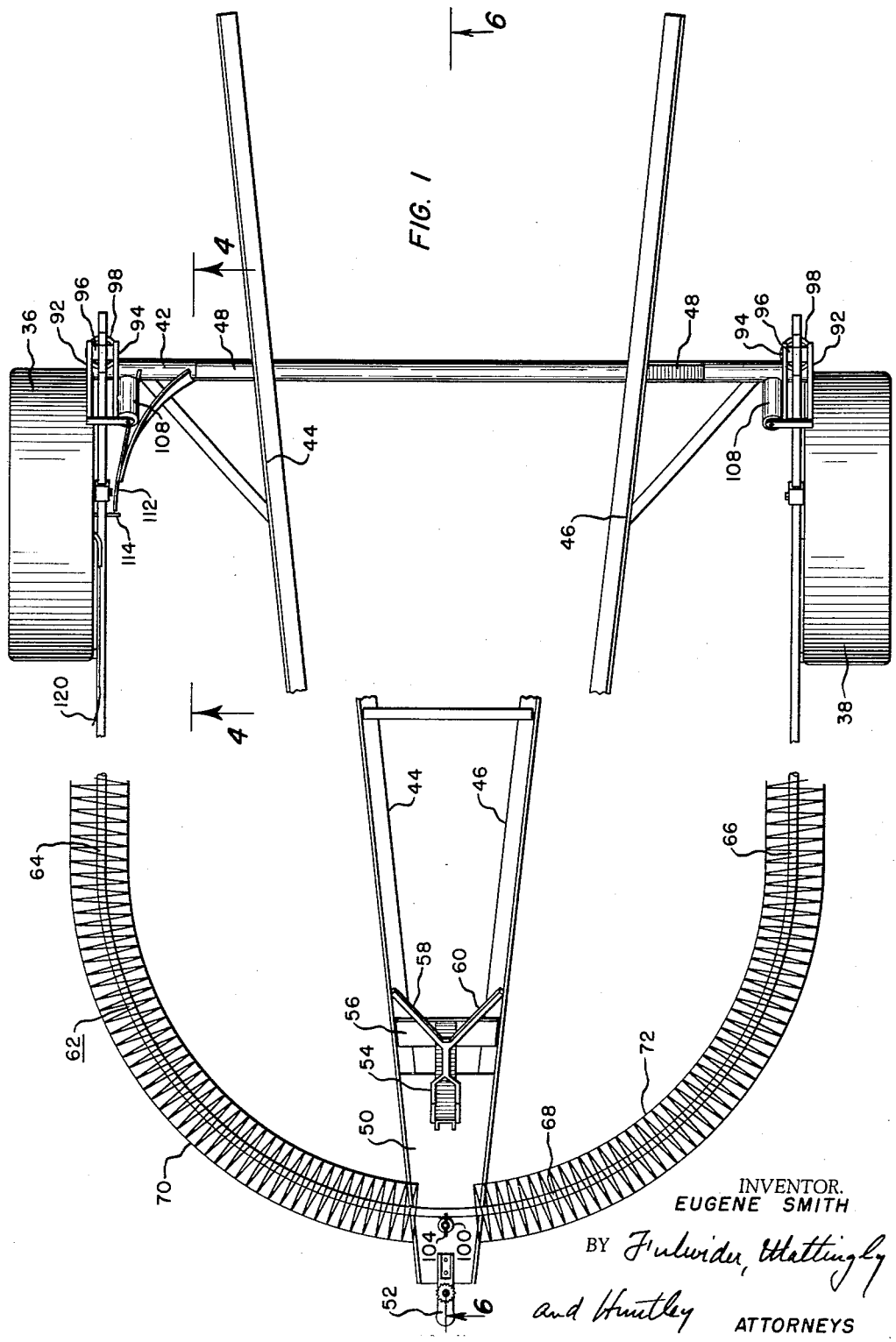
INVENTOR.
EUGENE SMITH
BY Fulwider, Mattingly
and Huntley    ATTORNEYS

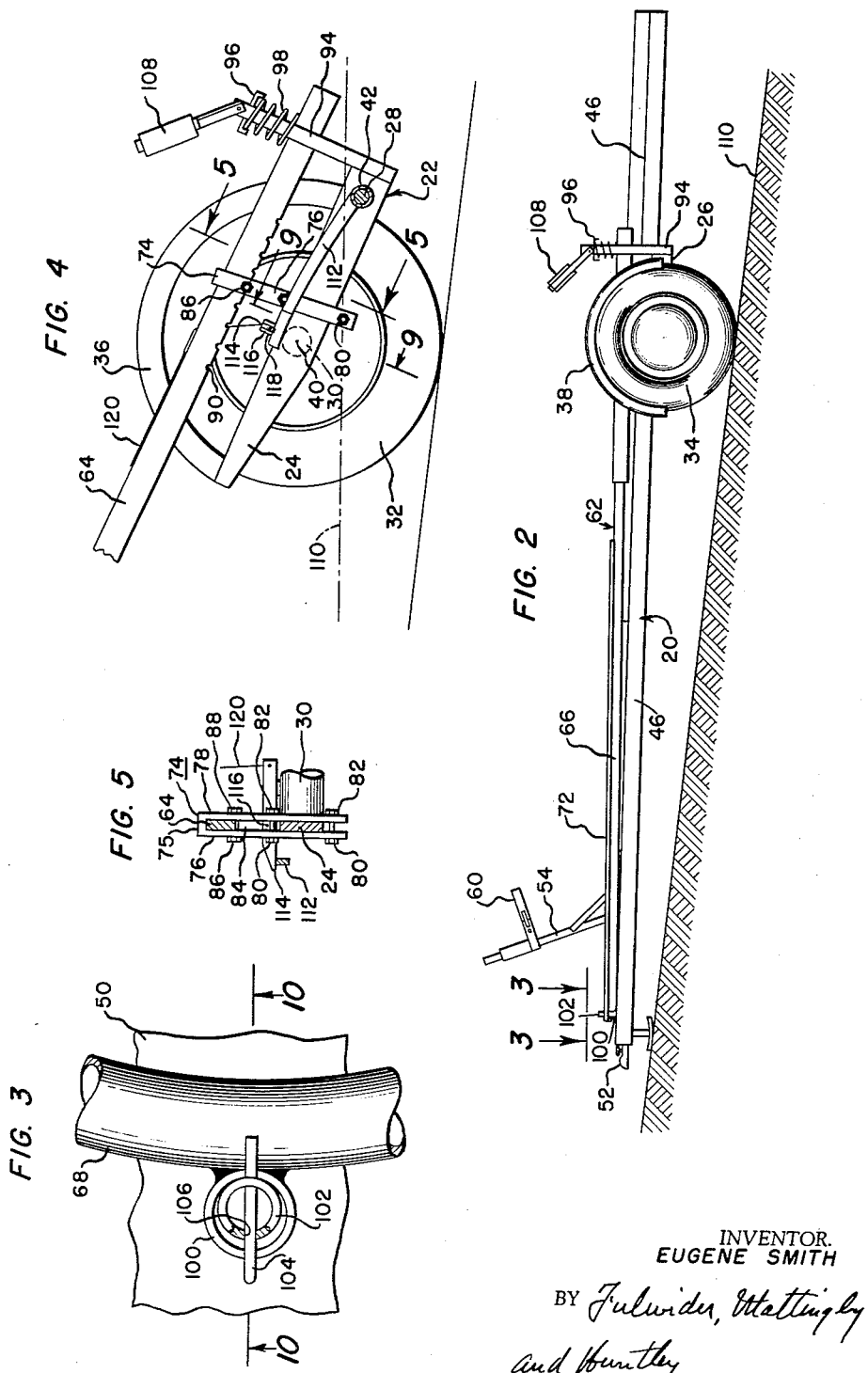

Nov. 22, 1960  E. SMITH  2,961,107
COMBINATION TRAILER FOR BOAT AND LAUNCHING APPARATUS
Filed Feb. 10, 1958  3 Sheets-Sheet 3
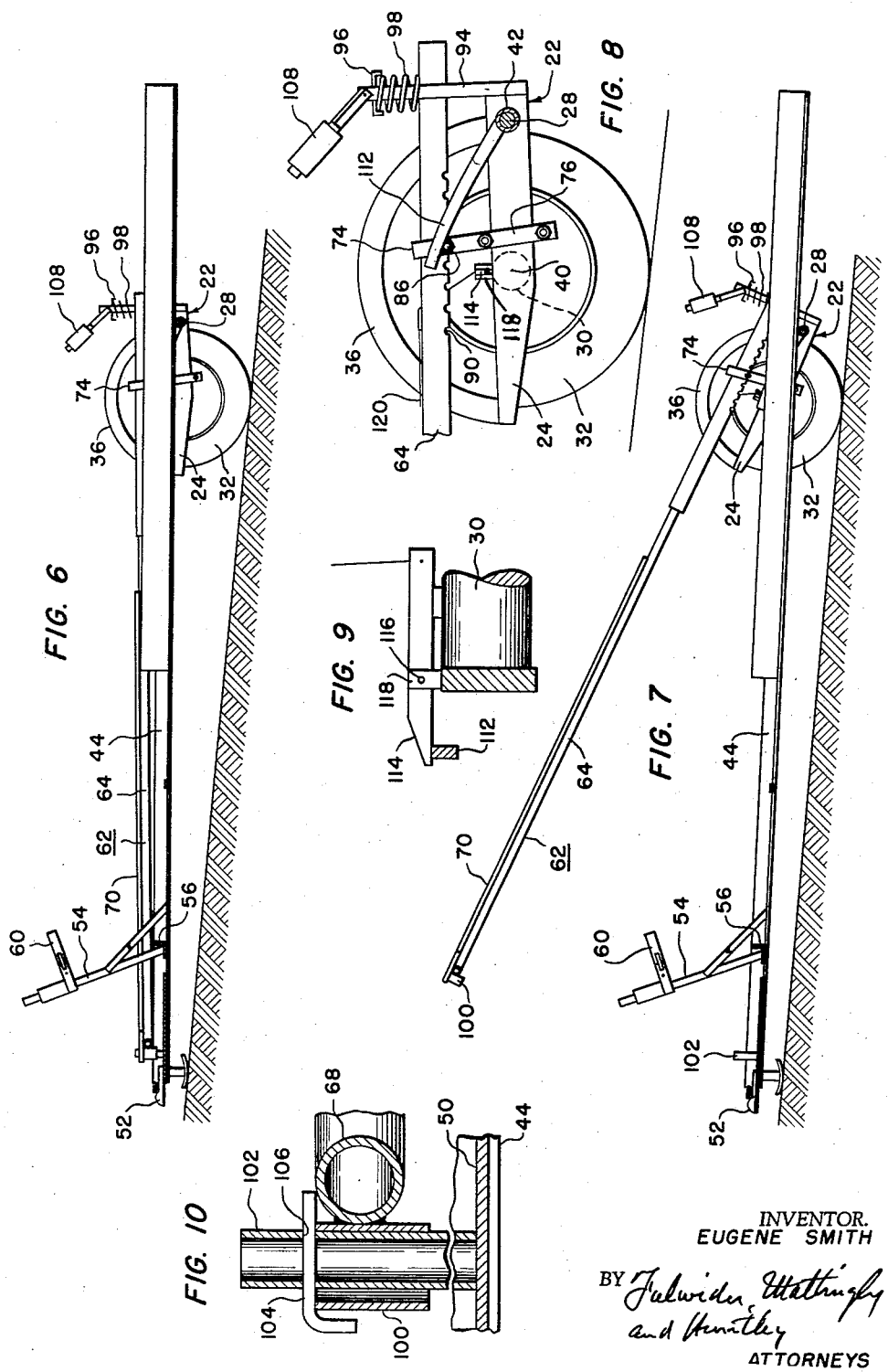
INVENTOR.
EUGENE SMITH
BY Fulwider, Mattingly
and Huntley
ATTORNEYS

United States Patent Office 2,961,107
Patented Nov. 22, 1960

2,961,107

COMBINATION TRAILER FOR BOAT AND LAUNCHING APPARATUS

Eugene Smith, 8614 Magnolia Ave., Santee, Calif.

Filed Feb. 10, 1958, Ser. No. 714,114

9 Claims. (Cl. 214—500)

The present invention relates to boat trailers and more particularly to trailers for carrying boats of the type in which the rear end thereof can be lowered and raised for respectively lowering the boat into the water and raising the boat out of the water.

The chassis of the present invention is latched or locked in position so that the boat cannot be lowered accidentally. Mechanism extends to the front of the boat by which the rear end of the chassis can be lowered when desired. This mechanism is in the form of a catwalk whereby the operator can utilize the same for walking above the water when the boat is about to be lowered into the water. In other words, when the trailer is backed into the water, the operator can use the catwalk to enter the boat and after unlatching the latch, the rear of the chassis is permitted to lower into the water, the weight of the operator causing the chassis to be lowered. Also the procedure is the reverse when docking the boat, i.e., by stepping from the boat onto the catwalk, the weight of the operator on the catwalk causes the rear of the chassis to be raised to raise the boat.

In practicing the present invention, I also provide a simple mechanism for varying the tension of the ride cushioning spring mechanism so that various weight and length boats are properly cushioned when being conveyed along the roads.

Further objects and advantages will be apparent from the following description, reference being had to the accompanying drawings wherein a preferred embodiment of the invention is illustrated.

In the drawings:

Fig. 1 is a top plan view of the improved trailer, the trailer being foreshortened by breaking away the center portion thereof;

Fig. 2 is a view showing the left side of the trailer on a smaller scale than that shown in Fig. 1;

Fig. 3 is a fragmentary top plan view looking in the direction of arrows 3—3 of Fig. 2;

Fig. 4 is a fragmentary sectional view taken along line 4—4 of Fig. 1 but showing the rear end of the chassis lowered from the position shown in Figs. 1 and 2;

Fig. 5 is a sectional view taken along line 5—5 of Fig. 4;

Fig. 6 is a sectional view taken on line 6—6 of Fig. 1, but on a smaller scale;

Fig. 7 is a sectional view similar to Fig. 6 but showing the apparatus in boat launching position;

Fig. 8 is a sectional view similar to Fig. 4 but showing the chassis in the same position as is shown in Figs. 1, 2 and 6;

Fig. 9 is a fragmentary sectional view taken on line 9—9 of Fig. 4, but on a larger scale; and Fig. 10 is a fragmentary sectional view taken on line 10—10 of Fig. 3.

Referring more in detail to the drawings, the trailer 20 includes a chassis 22, the chassis comprising two side frame members 24 and 26 formed of heavy sheet metal and which are joined with one another by being welded to a bar 28. The chassis also includes two axles which extend outwardly, one of which is shown in Fig. 5 at 30. These axles are welded to the outer side of the side frame members, one of which is shown at 24, and each axle carries a wheel, one of which is shown at 32 and the other at 34. The side frame member 24 also carries fenders or mudguards 36 and 38. The axes of the axle 30 are shown at 40, and it will be seen that they are aligned and lie forwardly of the bar 28. Thus the chassis 22 can be tilted about the axis 40 for the wheels.

A sleeve 42 is carried by the cylindrically shaped bar 28, the opposite ends thereof being in abutting relationship with the frame member 24. Angle irons 44 and 46 are suitably welded to the sleeve 42 and are further braced by gussets 48. These angle irons extend forwardly and rearwardly, and angle toward one another toward the front of the trailer, as is more clearly shown in Fig. 1. A plate 50 is suitably welded to the front ends of angle irons 44 and 46 and the extreme front end of this plate 50 carries a hitch 52 by which the trailer is adapted to be connected to the rear of an automobile or truck. An upright 54 is suitably carried by plate 50 which in turn is welded to the angle irons 44 and 46 rearwardly of the plate 50. This upright is provided with tines 58 and 60, the latter being disposed at substantially right angles to one another so as to receive the prow of the boat. The front end of the boat is suitably secured to this upright 54. The boat rests upon the angle irons 44 and 46. If desired the rear end of the boat can be tied to the angle irons in any suitable manner.

A U-shaped frame 62 formed of heavy gauge steel forms part of the operating mechanism of the trailer and includes a right leg 64, a left leg 66 and a yoke 68. The legs 64 and 66 are adapted to lie alongside the sides of the boat and the yoke 68 extends forwardly of the boat. The legs 64 and 66 and the yoke 68 carry catwalks 70 and 72; these catwalks are formed by sheet metal bent in zig-zag shape. The zig-zag sheet metal rests upon the legs 64, 66 and yoke 68 and are welded to the top side of the U-shaped frame 62.

A framework is provided on each side of the trailer for connecting the U-shaped frame 62 with the chassis. One of these frameworks is shown at 74 in Figs. 4 and 5. Each framework comprises a heavy gauge U-shaped sheet metal including legs 76 and 78 and a connecting yoke 75. Framework 74 is attached to side frame member 24 by bolts 80 and nuts 82 which clamp the side frame member 24 between the legs 76 and 78. The leg 64 extends through the passage 84 formed by the spaced legs 76 and 78 and the leg 64 rests upon a bolt 86 held in place by a nut 88. The underside of the leg 64 is provided with a plurality of transversely extending sockets 90 for receiving the shank of the bolt 86. It will be understood that the construction on the left side of the trailer is the same with respect to the leg 66 of the U-shaped frame 62 and its supporting frame 74.

Uprights 92 and 94 are suitably secured to the extreme rear ends of the side members 24 and extend on opposite sides of each of the legs 64 and 66 and carry spring seats 96. Cushioning means in the form of coil springs 98 are interposed between the underside of the spring seats 96 and the top of the legs 64 and 66. Thus when the boat weight is placed upon the bar 28 through the sleeve 42 and angle irons 44 and 46, the uprights 92 and 94 will be forced downwardly and will compress the springs 98. Thus the springs 98 function as cushioning means as the trailer rides across the road.

The boat can be balanced with respect to the trailer by shifting the frameworks 74 forwardly and rearwardly upon increase and decrease of the weight and length of the boat. This is accomplished by loosening or removing the bolts and nuts 80 and 82, shifting the same and then re-tightening or re-inserting the bolts. Obviously the bolts need be removed only when the frameworks 74 are moved forwardly of the axles 30. The fastening means for the front of the U-shaped frame 62 is shown in Fig. 3 wherein a sleeve 100 is welded to the extreme forward end of the yoke 68. This sleeve is arranged to slide over a sleeve 102 having the lower end thereof suitably secured to the plate 50. A pin 104 is arranged to extend through openings 106 in the sleeve 102.

The uprights 92 and 94 are arranged to carry rollers 108 which in turn are disposed on opposite sides of the boat to prevent sidewise movement of the boat.

In launching the boat the trailer is backed from the shoreline into the water, the ground level underneath the water being shown at 110. The attendant may walk along either side of the boat on a catwalk and enter the boat. After removing the pin 104, the weight of the operator will cause the side frames 24 and the U-shaped frame 62 to move in a clockwise direction. When this occurs the bar 28 will be lowered and the boat will be set afloat in the water. The boat can then be moved outwardly from the shore and, if desired, the trailer can be pulled toward the shortline. In docking the boat on the trailer, the operator can move the U-shaped frame 62 in a counterclockwise direction either manually or by walking on the catwalk towards the forward end of the trailer.

Inasmuch as the major portion of the U-shaped frame 62 and catwalk lies forwardly of the axis 40 of the wheels, the tendency is for this U-shaped frame to move in a counterclockwise direction and tends to maintain the rear end of the angle irons 44 and 46 in raised position. Obviously in this position it would be difficult to dock the boat on the trailer. Therefore I have provided a latch for holding the bar 28, and consequently the rear of the trailer, in its lowermost position, i.e., the front of the U-shaped frame 62 in its highest position. An arm 112 is suitably secured to the sleeve 42 as by welding. This arm 112 extends forwardly and is arranged to be engaged by a latch 114 to prevent counterclockwise movement of the U-shaped frame 62 relative to the chassis 22. Latch 114 is pivoted at 116 to bracket 118 carried by the top of frame member 24. When the front of the lever or frame 62 is being raised to lower the boat, the arm 112 will be lowered; the bottom edge of the arm will engage the inclined top edge of the latch 114 which latter will be moved in a counterclockwise direction, permitting the arm to pass by the nose of the cam, and after the arm passes the nose of the latch, and since the right side of the latch is heavier than the left side, the latch will assume a horizontal position, in which it overlies the arm 112. When the weight of the operator is removed from the lever 62, as when the boat is buoyed, the lever will tend to fall, however the latch 114, resting on arm 112, will prevent such falling, whereby the rear of the frame members are held in their lowermost position. The latch 114 can be released by lifting upwardly on the front of frame or lever 62 to lower the arm 112 and the latch then can be withdrawn by pulling on a cord 120 to move the same away from arm 112.

Thus it is apparent from the foregoing that I have provided a trailer which can be used for readily launching a boat in the water and removing the same from the water. I have provided for a simple manner of holding the chassis in its lowermost position for receiving the boat when it is to be removed from the water, and I have provided for giving a cushioning ride to the boat as it moves across the road.

While the form of embodiment herein shown and described constitutes a preferred form, it is to be understood that other forms may be adopted falling within the scope of the claims that follow.

I claim:

1. A trailer for carrying a boat comprising in combination, a chassis including side frame members, aligned axles extending outwardly from the frame members, wheels on said axles, said frame members extending rearwardly of the axles, means connecting the frame members with one another rearwardly of said axles; means pivotally carried by said first mentioned means to form a support for the rear of a boat and extending from the first mentioned means forwardly of the axles and providing a support for the front of the boat; a hitch connected with the forward end of the second mentioned means; means attached to one of the frame members for pivoting said one of said frame members and adapted to extend forwardly of said axles and alongside a boat carried by the chassis and the second mentioned means; and means for detachably connecting the last mentioned means to the second mentioned means.

2. A trailer as defined in claim 1, characterized in that the third mentioned means is U-shaped, one end of the third mentioned means being connected with one of the frame members and the other end being connected with the other frame member.

3. A trailer as defined in claim 1, characterized in that the first mentioned means is a bar having its opposite ends secured to the frame members.

4. A trailer for carrying a boat comprising in combination, a chassis including side frame members, aligned axles extending outwardly from the frame members, wheels on said axles, said frame members extending rearwardly of the axles, means connecting the frame members with one another rearwardly of said axles; means pivotally carried by said first mentioned means to form a support for the rear of a boat and extending from the first mentioned means forwardly of the axles and providing a support for the front of the boat; a hitch connected with the forward end of the second mentioned means; means pivotally attached to one of the frame members for pivoting said one of said frame members about a substantially horizontal axis and adapted to extend forwardly of said axles and alongside a boat carried by the chassis and the first mentioned means; cushioning means disposed between the said one frame member and the third mentioned means; and means at the front of the second mentioned means for detachably connecting the same with the first mentioned means.

5. A trailer as defined in claim 4, characterized in that a pivot is provided for attaching the third mentioned means and said one frame member and which pivot is shiftable forwardly and rearwardly with respect to the third mentioned means and said one frame member.

6. A trailer as defined in claim 4, characterized in that a catwalk is carried by the third mentioned means.

7. A trailer as defined in claim 4, characterized in that the third mentioned means is U-shaped having legs extending on opposite sides of a boat carried by the trailer.

8. A trailer as defined in claim 4, characterized in that the third mentioned means is U-shaped having legs extending on opposite sides of a boat carried by the trailer and further characterized in that each leg carries a catwalk.

9. A trailer as defined in claim 4, characterized in that one of said frame members carries a latch, and said second mentioned means carries an element engageable with said latch to releasably fix said second mentioned means in a predetermined pivoted position with respect to said one of said frame members.

References Cited in the file of this patent

UNITED STATES PATENTS

| | | |
|---|---|---|
| 2,332,326 | Lex | Oct. 19, 1943 |
| 2,708,045 | Shontz | May 10, 1955 |